Jan. 22, 1957
V. E. HAMREN
2,778,907
MACH NUMBER SENSOR
Filed June 1, 1954
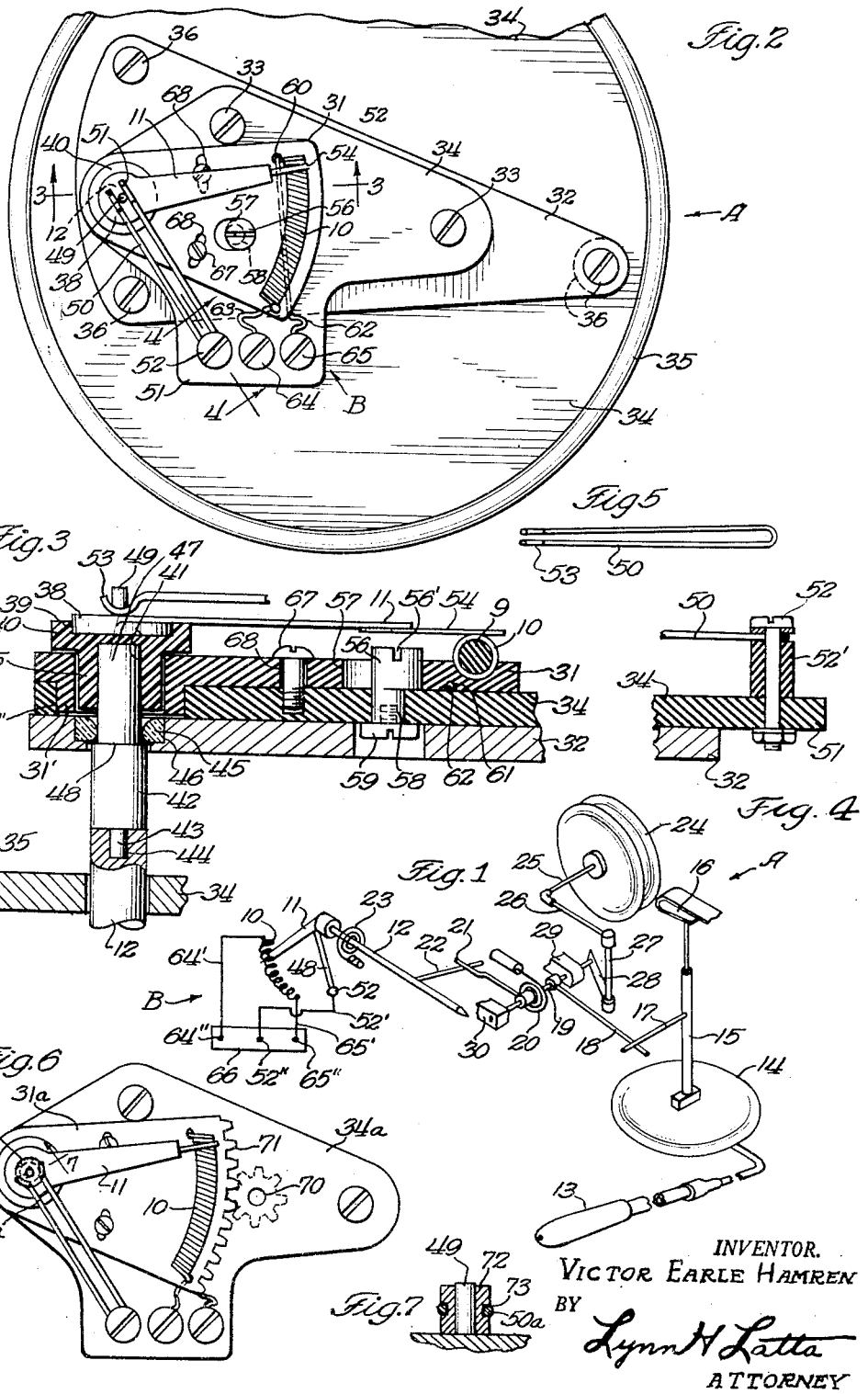
INVENTOR.
VICTOR EARLE HAMREN
BY
Lynn H Latta
ATTORNEY 2,778,907
Patented Jan. 22, 1957

2,778,907
MACH NUMBER SENSOR

Victor Earle Hamren, Los Angeles, Calif., assignor to Topp Industries Inc., Los Angeles, Calif., a corporation of California Application June 1, 1954, Serial No. 433,771

12 Claims. (Cl. 201—48)

This invention relates to speed responsive control apparatus for aircraft responsive to speed in terms of Mach numbers only; and has as its general object to provide an electrical circuit controlling instrument (which I preferably refer to as a Mach number sensing control transmitter) falling within the general category including potentiometers; and particularly characterized by being responsive to high and low air speeds in terms of Mach number measurements, and functioning to apply its response to the control of other apparatus through an electrical circuit such as a bridge circuit.

A specific object of the invention is to provide such a circuit controlling instrument which may utilize the basic mechanism of a high air speed sensing instrument of the type known in the art as a "Machmeter," and which combines therewith, apparatus for translating the response of such mechanism into an electrical signal proportional to Mach number, for use in bridge circuits, etc., such as can be used to control aircraft functions that vary with some direct relationship to Mach number, and which can be linear or nonlinear.

The invention deals, basically, with the problem of connecting a potentiometer to a standard Machmeter (which is a very sensitive precision instrument) in a manner to establish a mechanical connection between the potentiometer and the responsive mechanism of the Machmeter which will actuate the wiper arm of the potentiometer from the Machmeter mechanism. This has been considered by top research experts in the field of Machmeter design, and for a number of years was viewed by all as being considered an impossible achievement, since it would involve removing or disturbing parts of the Machmeter to establish a driving connection. This opinion was so widely and definitely held that prime contractors, attempting to procure an instrument that would accomplish the stated object, were advised by research experts to whom they looked as ultimate consultants on such matters, that the object could not be accomplished satisfactorily. In the face of this negative opinion by the most advanced experts, this invention has solved the problem as follows:

1. Removal of the pointer of the Machmeter, also the dial face and the pinion which established a gearing connection between the pointer and the gear sector shaft.

2. Adding a platform, attached to the top partition, for supporting the potentiometer.

3. Adding a shaft extension with a self-aligning bearing in the platform, to establish drive from the sector shaft to the potentiometer wiper.

4. Leaving the remaining mechanism of the Machmeter undisturbed.

A further object is to provide such a mechanism, in which the potentiometer is of relatively simple construction, and at the same time is of the highest precision characteristics and is adapted to attain the high resolution required generally for high performance aircraft.

Other objects will become apparent in the ensuing specifications and appended drawings in which:

Fig. 1 is a schematic perspective view of the operating mechanism of the apparatus, combined with a wiring diagram of a circuit in which the instrument is embodied;

Fig. 2 is a fragmentary plan view of the potentiometer instrument;

Fig. 3 is a detail sectional view taken on the line 3—3 of Fig. 2;

Fig. 4 is a fragmentary detail sectional view taken on the line 4—4 of Fig. 2;

Fig. 5 is a detail plan view of the contact brush;

Fig. 6 is a fragmentary plan view of a modified form of the invention; and

Fig. 7 is a detail sectional view of the same, taken on line 7—7 of Fig. 6.

As an example of one form in which the invention may be embodied, I have shown in the drawing a control apparatus including my improved Mach sensing control, indicated generally at A, and a control circuit which is indicated generally at B. The instrument A includes, in addition to Mach number measuring mechanism, commonly known as a "Machmeter", the potentiometer unit shown in detail in Figs. 2, 3 and 4. This potentiometer unit comprises generally an electrical resistor 10, which may be in the form of a coil wound on a core 9. In longitudinal contour, the resistor 10 is arcuate and concentric with the axis of pivotal movement of a wiper arm 11 which is arranged to sweep across the turns thereof. Arm 11 is mounted on a shaft 12 constituting a portion of the Mach number sensing mechanism which will now be described.

A pitot tube 13 is arranged to face in the direction of flight, whereby the relative air flow will develop ram pressure therein. This pressure is transmitted by pitot tube 13 to the Machmeter, which is of the type disclosed in Angst Patent 2,522,337 and includes an air speed diaphragm or bellows 14 at one side thereof which is fixed to an anchorage (not shown), the other side of the bellows registering changes in the transmitted pressure by expansion and contraction. These expanding and contracting movements are transmitted to one end of a link 15 the other end of which is loaded by a bow spring 16 in opposition to the expansion of bellows 14. Link 15 carries a laterally projecting arm 17 which bears against a lever 18 so as to transmit movement thereto in the direction of contraction of bellows 14. Lever 18 has its remote end secured to a shaft 19 which is subjected to a yielding torsion load by a spiral spring 20 in a direction to effect return movement of lever 18 when arm 17 backs off. A second lever 21 is secured to shaft 19 and bears against a lever 22 projecting laterally from shaft 12. Shaft 12 is subjected to a yielding torsion load by a spiral spring 23, in a direction to effect return movement of arm 22 when arm 21 backs off.

The Mach number meter embodies means for correcting for altitude, said means comprising an aneroid 24 (evacuated bellows), subjected to ambient atmospheric pressure, having one end fixed to an anchorage (not shown) and its other end arranged to transmit movement to a link 25 which movement is transmitted from link 25 to an arm 26 secured to an adjustment shaft 27. Shaft 27 carries an arm 28 which engages the end of shaft 19. Shaft 19 is slidably mounted in bearings 29, 30, and is so arranged with relation to arms 17 and 22 that, when shifted axially in one direction (the direction in which it is moved by arm 28) it will shorten the effective dimension of arm 22, whereas when moving in the other direction, it will lengthen the effective lever arm.

The shaft 19 is subjected to an axial spring load opposing the arm 28 and maintaining the shaft in contact therewith. This spring load may be furnished by the spiral spring 20 in addition to its above mentioned function of providing a yielding torque load acting on shaft 19.

The action of aneroid 24 compensates for the rarefication of the air at increasingly high altitudes, the aneroid embodying spring means (which may consist in the spring action of its bellows walls) and as the air pressure acting exteriorly of the aneroids decreases, the aneroid will expand, shifting shaft 19 in the direction to decrease the effective length of lever arm 22, thereby increasing the ratio of movement of arm 11 with reference to that of arm 21 to compensate for the reduced effectiveness of the rarefied air, acting in bellows 14, in overcoming the loading of spring 16. Consequently, the movements of shaft 12 may be related to air speeds in terms of Mach numbers.

The instrument, a major portion of which has just been described, commonly known as a "Machmeter" with high accuracy, high air speeds, in the neighborhood of and exceeding the speed of sound (Mach 1.0) as well as much lower speeds. Only the essential moving parts are shown in Fig. 1, in schematic layout, the casing and most of the framing being omitted for clarity in identifying the mechanism with the known Machmeter.

The present invention does not, however, utilize the entire Machmeter intact. In the Machmeter, a gear sector is attached to shaft 12 and is geared to a staff which carries a pointer for coaction with a suitably inscribed dial for visually indicating speed in terms of Mach numbers. The entire mechanism is encased in a casing 35 (Fig. 2) which is commonly cylindrical. The axis of the pointer staff is at the center of casing 35, and the shaft 12 is located near one side of the casing, as indicated in Fig. 2.

The shaft projects upwardly through head 34 of casing 35, and the staff is journalled between head 34 and a platform 32 which carries the dial. The platform 32 is connected to head 34 by three posts 36, and thereby supported in a position spaced above head 34.

For the purpose of the present invention, the dial, the pointer, the pointer staff and its pinion, are removed. The gear sector may optionally be removed or left attached to shaft 12, but forms no functional part of the present invention except as it may be utilized as a torsional-inertia counterbalance for arm 22, a function existing in the conventional Machmeter and accordingly is not illustrated. The remainder of the Machmeter mechanism, herein illustrated, is combined with the potentiometer parts which will presently be described, to constitute the control instrument of the present invention.

The resistor 10 is cemented into a conforming arcuate recess in the face of a sector 31, along the wider end thereof. Sector 31 is of insulating material (e. g. Bakelite resin sheet) and in turn is carried by a bracket 34 also of insulating material, mounted on platform 32 as by means of screws 33. Platform 32 in turn is mounted to the head 34 of the instrument casing 35 by means of the posts 36. The air speed sensing mechanism including parts 13–28 inclusive, and the major portion of shaft 12, are housed within casing 35 below head 34, with the shaft 12 projecting upwardly through head 34 at the left side of Fig. 2 (and as further illustrated in Fig. 3).

The wiper arm 11 is mounted upon shaft 12 by means of the following parts: arm 11 has a hub 38 of disc form which is mounted in a shallow circular recess 39 in a cap 40 of insulating material, and is secured to the cap as by cementing it into the recess 39. Cap 40 is of insulating material (nylon is suitable). Cap 40 has a socket 41 which receives and is secured to one end of a short extension shaft 42. The other end of shaft 42 has a short integral stem 43 of reduced diameter which is piloted and secured by a press fit in a bore 44 of corresponding dimension conventionally existing in the exposed end of the shaft 12. Extension shaft 42 projects through and is supported for rotation within an antifriction bearing 45 mounted in a counterbore 46 in bracket 32. Bearing 45 is a jewel bearing, with a toroidal internal bearing face which engages, with circular line contact, a reduced upper end portion 47 of shaft 42, thereby providing a self-aligning mounting of extension 42 and shaft 12, the lower end of shaft 12 being supported for universally pivotal movement by a cone-bearing constituting part of the existing structure of the Machmeter. Thus I avoid the occurrence of couple loads between the shaft and bearing. The bearing 45 also has light end bearing engagement without pressure, against a polished shoulder 48 on shaft 42 at the base of reduced portion 47, or may have end-retaining overhang relative to shoulder 48, without actually engaging the same with a maximum axial clearance of .002 inch. Bearing 45 is retained in counterbore 46 by a press fit therein.

Hub 38 has an integral concentric terminal stud 49. A brush 50 of hairpin form, is secured to an arm 51 of bracket 34 between the head of a bolt 52 and a spacer sleeve 52'. Screw 52 also functions as a terminal to which a conductor or conductors may be connected (Fig. 1). Bolt 52 extends through the loop portion joining the respective arms of brush 50. At the opposite end of the brush, the free ends of its arms are curved to provide substantially semi-circular contactor tips 53 (Fig. 3) which ride against the upper face of hub 38 to provide an electrical connection therewith. As secured by terminal 52, brush 50 will be slightly flexed upwardly when in engagement with hub 38. The arms, being of spring wire, will exert very slightly yielding downward pressure of contactor tips 53 against hub 38, near the center thereof so as to reduce to a minmium the drag torque against hub 38, and substantially all of the available torque coming from shaft 12 is utilized in swinging the wiper arm 11 across resistor 10. At this point, it may be noted that the available torque is extremely small, so much so that in the complete Machmeter, when operating in attenuated air at 50,000 feet altitude, a human hair, hanging from the glass face of the instrument (at about an eighth inch above the level of the pointer) will completely stop the movement of the pointer if it intersects the path thereof and is engaged thereby. The arms of brush 50 may be formed with normally closer spacing than that determined by engagement with the sides of terminal post 49, so as to snugly engage post 49, and thus the maximum electrical contact between the brush and the wiper arm 11 is provided. Wiper arm 11 has a tip 54 comprising a short length of spring wire which slides smoothly over the turns of coil 10 with minimum resistance to the movement. The diameter of tip 54 is much greater than that of the wire of resistor 10, being preferably as much as 25:1 on the average (the ratio may vary from 40:1 to about 20:1) and resistor 10 is wound as closely as possible (winding density i. e., the percentage of any unit length of winding which is occupied by the aggregate turns of wire as contrasted to the spaces between the wires, being preferably about .833, average, and within range of from .65 upwardly.

The tip 54 and resistor 10 (as well as brush 50, are of non-corroding precious metal, preferably a platinum alloy. The body of wiper arm 11 is of a spring metal such as beryllium-copper, gold plated.

Winding 10 is insulation-coated (except where insulation is removed in the area of contact by wiper tip 54).

Sector 31 has, at its narrow end, a cylindrical hub portion 31, coaxial with resistor 10 and journalled in a cylindrical bore 31" in bracket 34. Hub 31' loosely receives a reduced portion 55 of hub 40, with complete freedom from torsional drag thereon. The sector 31 is pivoted by hub 31' at the axis of shaft extension 42, for swinging adjustment. Such adjustment is provided for by an eccentric 56 engaging the approximately elliptical wall of an aperture 57 in sector 31. Eccentric 56 has an eccentric trunnion 58, journalled in bracket 34, and may be retained therein by the head of a screw 59 threaded into its lower end. At its upper end, eccentric 56 has a screw-driver slot 56' (or equivalent) for actuation thereof by a screw driver or wrench.

Sector 31 is held down upon bracket 34 by a pair of screws 67, passing through elongated slots 68 in sector 31 and threaded into bracket 34. Slots 67 are concentric with the axis of shaft element 42. Normally, the sector is tightly secured to bracket 34 by cinching down the screws 67. By loosening screws 67 and actuating eccentric 56, the position of resistor with reference to wiper arm 11 may be adjusted for effecting phasing adjustment thereof (adjusting the electrical resistance at any selected point along the length of the resistor, to a given Mach number).

The ends of resistor 10 are passed downwardly through apertures 60 in sector 31, thence horizontally along the upper surface of bracket 34 in grooves 61 in the underside of sector 31, to provide connections 62, 63 to terminals 64, 65 in the arm 51 of bracket 34. Terminals 52, 64, 65 extend downwardly through bracket 34, clearing the side of platform 32 so that conductors 52', 64', 65' (Fig. 1) may be conveniently connected thereto, for extension to the connector points 52'', 64'', 65'' of any conventional connector plug or other connector device 66. From connector 66, connections to a Wheatstone bridge or other control circuit component utilizing a potentiometer, may be established through a mating connector.

Shaft 12 extends, with sufficient clearance to avoid contact with head 34, through an opening in the head, whereby the shaft is supported solely by the conventional core bearing at one end, and the jewel bearing 45.

From the foregoing, it will be apparent that the entire torsional drag against shaft 12, occasioned by the combination of the potentiometer with the Machmeter, is confined to the sum of the slight drag of jewel bearing 45 against shaft part 47, and the slight drag of wiper arm tip 54 across the winding of resistor 10.

Fig. 6 illustrates a modified form of the invention wherein adjustment of sector 31a is effected by a wrench tool (such as a Jacobs chuck wrench) having a pilot fulcrumed in a bore 70 in bracket 34a and adapted to mesh with gear teeth 71 on the wide end of sector 31a. This figure also illustrates a modification of the brush contact, utilizing a contact ring 72 loosely receiving post 49 and having an annular peripheral groove 73 in which the arms of brush 50a are received.

I claim:

1. A potentiometer for attachment to a Mach number air speed responsive control instrument embodying: a casing; means in said casing responsive to air speed changes; linkage receiving movement from said responsive means and translating it into rotary movement; a shaft to which said rotary movement is transmitted by said linkage; an aneroid, responsive to changes in altitude, connected to said linkage for adjusting the ratio of said translation; said casing including a head having an opening through which said shaft extends with clearance for self aligning adjustment, said potentiometer comprising a platform member secured to said head and spaced therefrom; a bracket member secured to said platform, parallel thereto; a cylindrical extension attached to said shaft in end-to-end, coaxial relation thereto and projecting through said members; an antifriction bearing mounted in one of said members, encircling said extension, and having self-aligning, low-drag bearing contact therewith; a potentiometer resistor mounted on said bracket, concentric with said extension and in a plane parallel to that of said bracket, a potentiometer wiper arm arranged to sweep the length of said resistor; an insulator cap by which said arm is mounted to the outer end of said extension; and electric connections to said wiper arm and to the respective ends of said resistor, the contact of said wiper arm with said resistor, and said bearing contact, constituting the sole elements of torsional drag against said shaft other than that of a universal bearing at the end of said shaft opposite said extension.

2. A potentiometer as defined in claim 1, wherein said bearing is a jewel bearing and is mounted in said platform.

3. A potentiometer as defined in claim 2, wherein said wiper arm has a wire tip for contact with said resistor, and wherein said resistor is a coil of fine wire having a diameter the ratio of which, to that of said tip, is within a range of between about 40:1 and about 20:1.

4. A potentiometer as defined in claim 3, wherein said coil is closely wound, with a winding density of at least .65.

5. A potentiometer as defined in claim 4, wherein said tip and coil are of platinum alloy.

6. A potentiometer as defined in claim 1, including a resistor mounting sector having said coil mounted to the face thereof at one end thereof and having at its other end a tubular hub projecting from its opposite face, said sector having said opposite face bearing against said bracket and having said hub journalled in a bore in said bracket and surrounding said extension but out of contact therewith; and means for effecting relative arcuate adjustment of said sector, about said extension, relative to said bracket.

7. A potentiometer as defined in claim 1, including a resistor mounting sector having said coil mounted to the face thereof at one end thereof and having at its other end a tubular hub projecting from its opposite face, said sector having said opposite face bearing against said bracket and having said hub journalled in a bore in said bracket and surrounding said extension but out of contact therewith; and means for effecting relative arcuate adjustment of said sector, about said extension, relative to said bracket, said last mentioned means comprising an eccentric having a trunnion journalled in said bracket and an eccentric head engaged in an elongated aperture, in said sector and having a wrenching head for actuation thereof by a rotation transmitting tool.

8. A potentiometer as defined in claim 1, including a resistor mounting sector having said coil mounted to the face thereof at one end thereof and having at its other end a tubular hub projecting from its opposite face, said sector having said opposite face bearing against said bracket and having said hub journalled in a bore in said bracket and surrounding said extension but out of contact therewith; and means for effecting relative arcuate adjustment of said sector, about said extension, relative to said bracket, said last mentioned means comprising said spur gear teeth on the end of said sector adjacent said coil, and a bearing in said bracket adjacent but beyond the tips of said teeth, for piloting a wrenching tool having a pinion for meshing engagement with said teeth.

9. A potentiometer as defined in claim 1, wherein said bracket has an arm projecting beyond a side margin of said platform, and wherein said electrical connections include terminals mounted in said arm, in insulated relation to one another, and intersecting the plane of said platform but out of contact therewith.

10. A potentiometer as defined in claim 1, wherein said bracket has an arm projecting beyond a side margin of said platform, and wherein said electrical connections include terminals, mounted in said arm, in insulated relation to one another, and intersecting the plane of said platform but out of contact therewith, a hub of said wiper arm, mounted in said insulator cap and having an annular contact face and a contact post projecting from the center thereof, coaxial with said extension; and a connector brush of hairpin form having a loop end anchored to one of said terminals and a pair of opposite ends embracing said contact post and bearing against said contact face.

11. A potentiometer as defined in claim 1, wherein said bracket has an arm projecting beyond a side margin of said platform, and wherein said electrical connections include terminals, mounted in said arm, in insulated relation to one another, and intersecting the plane of said platform but out of contact therewith, a hub of said wiper arm, mounted in said insulator cap and having an annular contact face and a contact post projecting from the center thereof, coaxial with said extension; and a connector brush of hairpin form having a loop end anchored to one of said terminals and a pair of opposite ends embracing said contact post; and a conductor sleeve encircling said post and seated against said contact face, said sleeve having an annular lateral groove in which said brush ends are received.

12. A potentiometer as defined in claim 1, wherein said bracket has an arm projecting beyond a side margin of said platform, and wherein said electrical connections include terminals mounted in said arm, in insulated relation to one another, and intersecting the plane of said platform but out of contact therewith, said bracket and sector both being of insulating material.

References Cited in the file of this patent

UNITED STATES PATENTS

| | | |
|---|---|---|
| 2,522,337 | Angst | Sept. 12, 1950 |
| 2,542,717 | Smith | Feb. 20, 1951 |
| 2,618,973 | Peterson | Nov. 25, 1952 |